United States Patent
Rahman et al.

(10) Patent No.: US 8,306,532 B2
(45) Date of Patent: Nov. 6, 2012

(54) SYSTEM AND METHOD FOR USING MULTIPLE SUBSCRIBER IDENTITIES TO PROVIDE DIFFERENTIATED SERVICES TO SUBSCRIBERS

(75) Inventors: Iftekhar Rahman, Billerica, MA (US); Praveen Venkataramu, Morris Plains, NJ (US); Kyriaki Konstantinou, New York, NY (US)

(73) Assignee: Cellco Partnership, Basking Ridge, NJ (US)

( * ) Notice: Subject to any disclaimer, the term of this patent is extended or adjusted under 35 U.S.C. 154(b) by 599 days.

(21) Appl. No.: 12/492,782

(22) Filed: Jun. 26, 2009

(65) Prior Publication Data
US 2010/0330986 A1    Dec. 30, 2010

(51) Int. Cl.
H04W 4/00 (2009.01)
H04B 1/38 (2006.01)
(52) U.S. Cl. ............ 455/435.1; 455/432.1; 455/558
(58) Field of Classification Search ........... 370/466, 370/389; 455/435.1, 411, 432.1
See application file for complete search history.

(56) References Cited

U.S. PATENT DOCUMENTS
2002/0154632 A1  10/2002  Wang et al.
2005/0282544 A1  12/2005  Oommen et al.
2009/0149220 A1   6/2009  Camilleri et al.

FOREIGN PATENT DOCUMENTS
EP         2 094 057 A2    8/2009
WO    WO 2008/129014 A2   10/2008

OTHER PUBLICATIONS
European Search Report issued in European Patent Application No. EP 10006691.9 dated Jan. 18, 2011.

*Primary Examiner* — George Eng
*Assistant Examiner* — Nizar Sivji

(57) ABSTRACT

The techniques disclosed here enable a mobile station device having a plurality of subscriber identities to select an identity for registration with a network for wireless communications in a way that takes advantage of the most favorable roaming agreements between operators. The identity selection algorithm, for example, provides the flexibility to select amongst mobile station subscriber identities of 3GPP2 (1xRTT, EVDO) access technologies and 3GPP (LTE/GSM/UMTS) access technologies as well as specific operators' networks for domestic and international roaming. The exemplary algorithms allow the operator to optimize roaming agreements in different markets and maximize revenue from the roaming of its customers.

9 Claims, 6 Drawing Sheets

SYSTEM AND METHOD FOR USING MULTIPLE SUBSCRIBER IDENTITIES TO PROVIDE DIFFERENTIATED SERVICES TO SUBSCRIBERS

TECHNICAL FIELD

The present subject matter relates to techniques and equipment to select an identity of a subscriber and register the identity of the subscriber for wireless communications in a way that allows for multiple subscriber identities to be utilized in one mobile subscriber device to take advantage of the most favorable roaming agreements between operators, typically, so as to allow the home operator to optimize roaming agreements in different markets and maximize the home operator's revenue from roaming of its subscriber.

BACKGROUND

In recent years, use of mobile communications devices for voice telephone services, email or text messaging services and even multi-media services has become commonplace, among mobile professionals and throughout the more general consumer population. Mobile service provided through public cellular or PCS (personal communication service) type networks, particularly for voice telephone service, has become virtually ubiquitous across much of the world. The rapid expansion of such mobile communication services has resulted in deployment of a variety of different and often incompatible wireless network technologies, in different jurisdictions or regions and in some cases as competing services within the same area. A large carrier may operate its network over a wide geographic area, however, to allow roaming of its subscribers outside even that coverage area, the carrier will have roaming agreements with operators of other networks in other areas. With the increase in international roaming, a demand has arisen for roaming into areas where coverage is provided by networks that utilize different and possibly incompatible technologies. To allow continued operation in regions where the local provider offers service via a different technology, station manufactures have developed dual or multi mode mobile stations, which have the capability of communicating via two or more wireless mobile technologies. As a corollary, the home operator's roaming agreements with other operators/providers now include agreements with local providers which operate networks that utilize different and possibly incompatible technologies.

Under typical roaming agreements, customers of the other providers may roam-in and use the home operator's network, whereas customers of the home operator may roam-out and use the networks of the other operators/service providers. However, different roaming agreements among the parties may have different terms. As a result, some agreements may be more favorable, and a particular home operator or service provider may 'prefer' for its customers to utilize the network of a particular other provider in certain areas. Hence, the network operators and their equipment vendors have standardized a number of signaling protocols and have developed various related mobile station hierarchical processing techniques to select an available network of a provider with which the home operator has the most preferred roaming agreement, that is to say the agreement requiring the home operator to pay the lowest rate to the visited network provider for the subscriber's service obtained while roaming into and using the visited network. Typically, once the device selects the system in which to establish a wireless communication, the mobile device must register itself with the system in order to avail itself to the wireless services provided by the selected system. The registration process requires a mobile subscriber identity.

More recently, in addition to selecting a preferred network, the wireless network operators may have begun to provide subscriber devices with multiple identities for various reasons. With subscriber devices having multiple identities, the selection of a single identity at a time is required to register the subscriber device with a given network at a given time. Therefore, an attendant need has arisen for such a device to select from among its assigned identities as it roams and registers with various networks. In one example, each identity may be tied to a different home network. The home networks may in some cases belong to business partners, or in other cases belong to different subsidiaries of a parent organization. In addition, each home network may have different roaming agreements with different network operators in various areas or countries. In order for a subscriber to take advantage of the best roaming agreement, e.g., in financial terms, a particular mobile subscriber identity would be preferable to another when registering for service on a visited network.

In another example of a subscriber having multiple identities, an enterprise customer may be provided with different identities that have service agreements based on time-of-day use. In the same area, a visited network may offer better roaming rates than another based on the time of day or the day of the week that service is requested. Therefore, in order for a subscriber to take advantage of the best roaming agreement, e.g., the least expensive roaming rates, a particular mobile subscriber identity would be preferable to another when registering for service on the visited network.

As noted, once the device selects the system or network in which to establish a wireless communication, the mobile device must register itself with the system in order to avail itself of the wireless services provided by the selected system; and that registration process requires a mobile subscriber identity. In the case of 3GPP technologies, the mobile subscriber identity is represented by an IMSI. In the case of 3GPP2 technologies, the mobile subscriber identity is represented by an MDN/MIN pair, or an MDN/MSISDN/MIN pair. In the case of WLAN or WiMAX, the mobile subscriber identity can be extended to and represented by an APN, NAI, etc.

One solution for registering a subscriber device having multiple identities would be to select the last used identity of the subscriber device and attempt to register that identity for wireless communications service on the selected network. The selected network would determine whether the identity is desired, and reject the identity if not desired. If rejected, another identity would be selected, and the subscriber device would make another attempt to register the identity with the selected network. This process would continue until the registration succeeded or failed after a predetermined number of attempts. At that point, the device may attempt to select another network, e.g. the next most preferred network if one is available, and repeat the processing of trying one or more of its identities until the device successfully registers. The nature of this solution, i.e., request-reject-retry, creates delays in registration by requiring repeated attempts even with the first selected network, and may require additional time to scan for alternative networks, read broadcast messages, select the system, and perform registration with the network selected for that registration attempt.

Hence, there is a need for improvement in the technique to select an identity of a subscriber device having multiple identities and register the selected identity with a network for wireless communications, in a way that takes advantage of the most favorable roaming agreements between operators, e.g. for domestic and international roaming.

SUMMARY

In a disclosed exemplary solution, a method is provided for selecting a subscriber identity of a mobile station having at least two subscriber identities. The method includes selecting a mobile network for establishing wireless communication for the mobile station in response to over-the-air signaling received at the mobile station. The networks are selected from among networks capable of providing wireless communications service to the mobile station. In response to the selection of the network, the method includes selecting a subscriber identifier associated with the mobile station, which corresponds to one of the mobile station subscriber identities, for registering the mobile station to the selected network. The subscriber identifier is selected from among subscriber identifiers of the mobile station stored in memory of the mobile station.

In a more specific example of the exemplary solution, the step of selecting the subscriber identifier may include matching the selected network with a subscriber identifier of the mobile station for the selected network. Similarly, in another example, the step of selecting the subscriber identifier may include matching the selected network and an access technology of the selected network with a subscriber identifier of the mobile station for the selected network and access technology. Likewise, an example of the step of selecting the subscriber identifier includes matching the selected network and time of day the selected network is selected with a subscriber identifier of the mobile station for the selected network and the time of day. In a further example, the step of selecting includes matching the selected network, the access technology, and time of day with a subscriber identifier of the mobile station for the selected network, the access technology, and the time of day.

In another exemplary solution, a method is provided for registering a mobile station having a plurality of the subscriber identities to a mobile network. A first of the mobile station subscriber identities is associated with a first wireless communications service provider. Likewise, a second of the mobile station subscriber identities is associated with a second wireless communications service provider. Included in the method are steps for detecting a signal at the mobile station for identifying one or more mobile networks providing wireless communications service in a region of operation of the mobile station, and in response to the detected signal, selecting a mobile network for establishing wireless communications for the mobile station. The mobile network is selected from among networks capable of providing wireless communications service to the mobile station. In addition, the method includes selecting the first subscriber identity or the second subscriber identity of the mobile station based on a preference of the first service provider or the second service provider, respectively, relative to the selected network. The subscriber identity is selected from among subscriber identities of the mobile station stored in memory on the mobile station. The method further includes registering the mobile station for wireless communication via over-the-air wireless signaling with the selected network, using the selected subscriber identity of the mobile station.

In a more specific example of this second method, the signal identifying one or more mobile networks includes a Mobile Country Code and Mobile Network Code (MCC/MNC) pair used in the step of selecting the mobile network. The first and second mobile station subscriber identities, in this example, are each represented by an IMSI. In another example, the signal identifying one or more mobile networks includes System Identifier and Network Identifier (SID/NID) pair used in the step of selecting the mobile network. The first and second mobile station subscriber identities, in this example, are each represented by an Mobile Directory Number and Mobile Identification Number pair (MDN/MIN) pair.

In another exemplary solution, a method is provided for registering a mobile station having at least two subscriber identities to a mobile network. Included in the method are steps for detecting a signal at the mobile station for identifying one or more mobile networks providing wireless communications service in a region of operation of the mobile station, and in response to the detected signal, selecting a mobile network for establishing wireless communications for the mobile station. The mobile network is selected from among networks capable of providing wireless communications service to the mobile station. In addition, the method includes selecting a subscriber identity of the mobile station based on the selected network. The subscriber identity being selected from among subscriber identities of the mobile station. The method also includes retrieving a subscriber identifier associated with the mobile station for the selected subscriber identity, from memory of the mobile station. The method further includes registering the mobile station for wireless communication via over-the-air wireless signaling with the selected network, using the retrieved subscriber identifier for the selected subscriber identity of the mobile station.

In a more specific example of this method, the step of selecting the subscriber identify of the mobile station is further based on the access technology of the selected network, a time of day the selected network is selected, or both. In another example, at least one of the subscriber identities of the mobile station is represented by an IMSI. In this example, at least another one of the subscriber identities of the mobile station is represented by a MDN/MIN pair. In a further example, at least one of the subscriber identities of the mobile station is represented by a MDN/MIN pair.

A more specific example discussed here utilizes a step of selecting the subscriber identity of the mobile station may include matching the selected network with a subscriber identity of the mobile station for the selected network, from a list of the at least two subscriber identities stored in memory of the mobile station. In another specific example, the step of selecting the subscriber identity of the mobile station may include matching the selected network and an access technology of the selected network, or a time of day the selected network is selected, or both, with a subscriber identity of the mobile station for the selected network, the access technology, or the time of day, or both. The subscriber identities selected from a list of the at least two subscriber identities stored in memory of the mobile station.

The subscriber identity selection algorithms and registration algorithms as outlined above may be implemented as various combinations of method technologies, mobile station hardware and associated software (program instructions and selection lists). The software may be downloaded from system hardware connected to communicate with the mobile station directly or via the network(s). System hardware may comprise special purpose hardware or one or more general purpose devices programmed to implement the software download functions. A software product or "article of manufacture" includes at least one machine-readable medium and information carried by the medium. The information carried by the medium may be executable program code and data for the various selection algorithms, including lists, which enable a programmable mobile station device to implement the identity selection-related functions and registration-related functions like those discussed in more detail below.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various technologies disclosed herein relate to a mobile station having a plurality of subscriber identities and selection of a subscriber identity, from among the plurality of identities, for registration with a network for wireless communications, including for example, where the mobile station is capable of communications via a number of different technologies.

Preferably, the selection technique enables the multi-mode mobile station to generally take advantage of the most favorable roaming agreements between network operators. The identity selection algorithm, for example, provides the flexibility to select amongst mobile station subscriber identities of 3GPP2 (1×RTT, EVDO) access technologies and 3GPP (LTE/GSM/UMTS) access technologies as well as specific operators' networks for domestic and international roaming.

In addition, the identity selection algorithm provides flexibility to select between different networks based on other factors, such as on time of day and the access technology of the particular network. The exemplary algorithms discussed below allow the operator to optimize roaming agreements in different markets and maximize revenue from the roaming of its customers.

Figure 1:
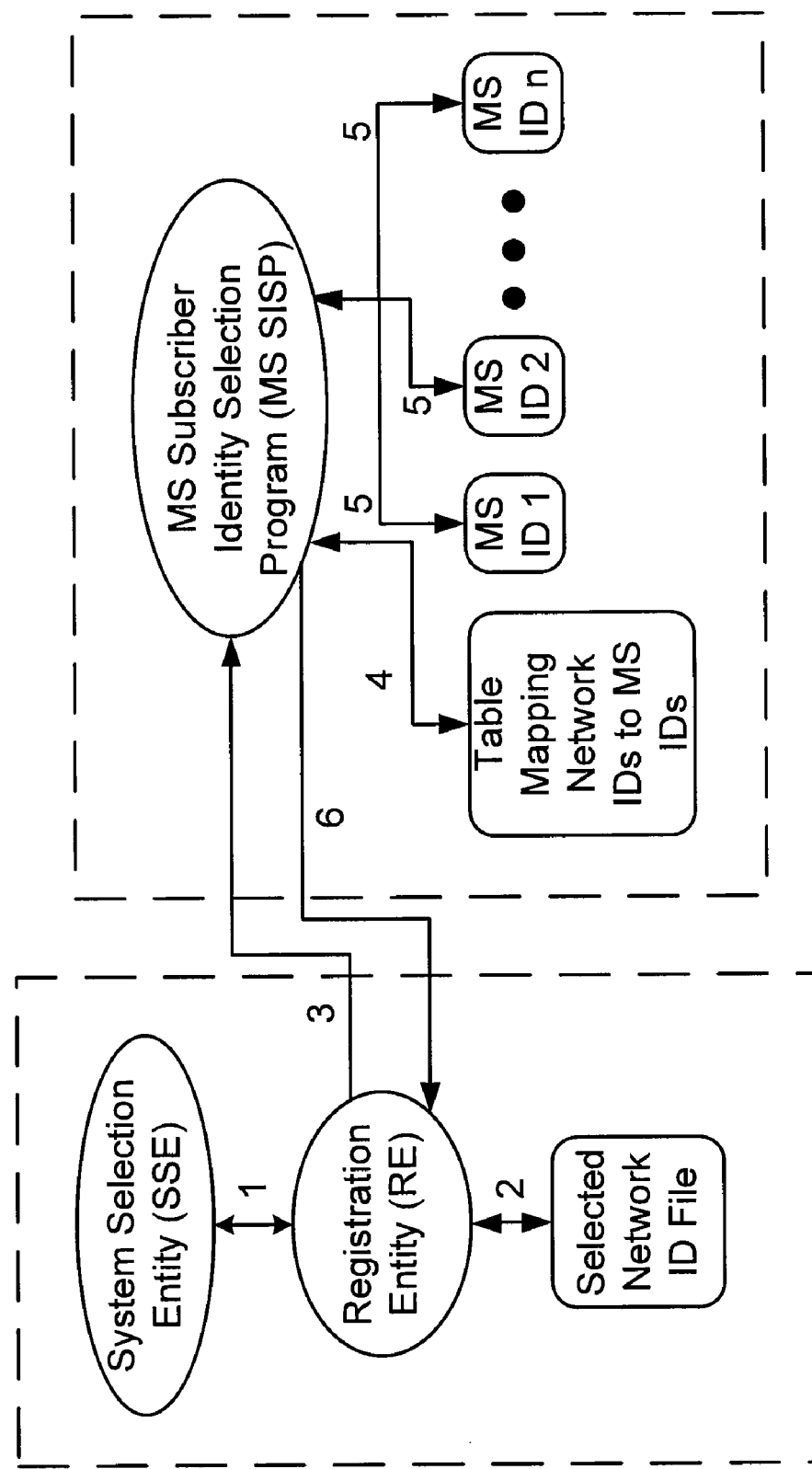
FIG. 1 is a general diagram illustrating an example of mobile station components configured to implement mobile station subscriber identity selection methods.
Figure 2:
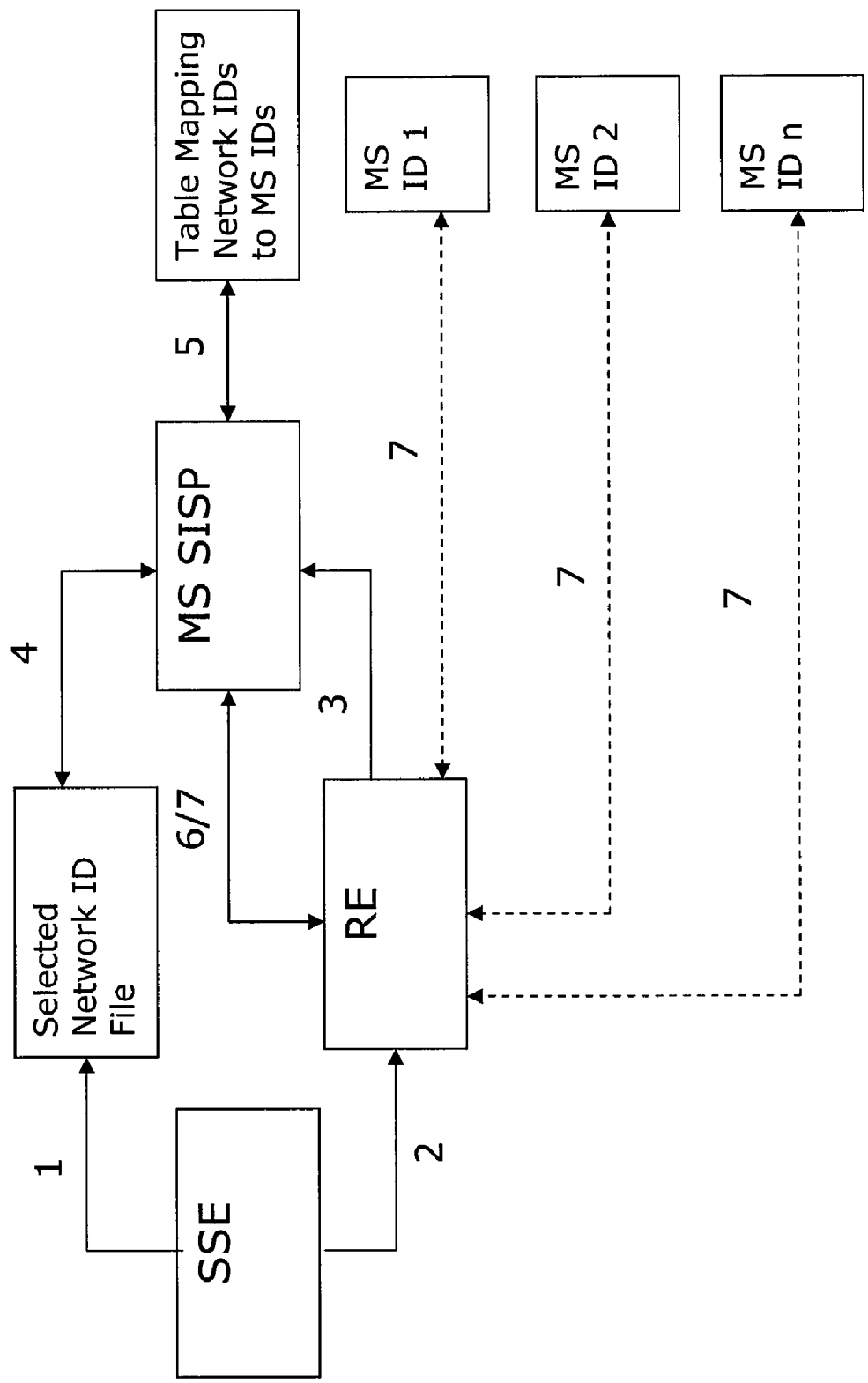
FIGS. 2-3 are diagrams illustrating examples of mobile station components and exemplary methods that may be implemented in a mobile station, to perform mobile station subscriber identity selection with multi-mode/technology capabilities.
Figure 3:
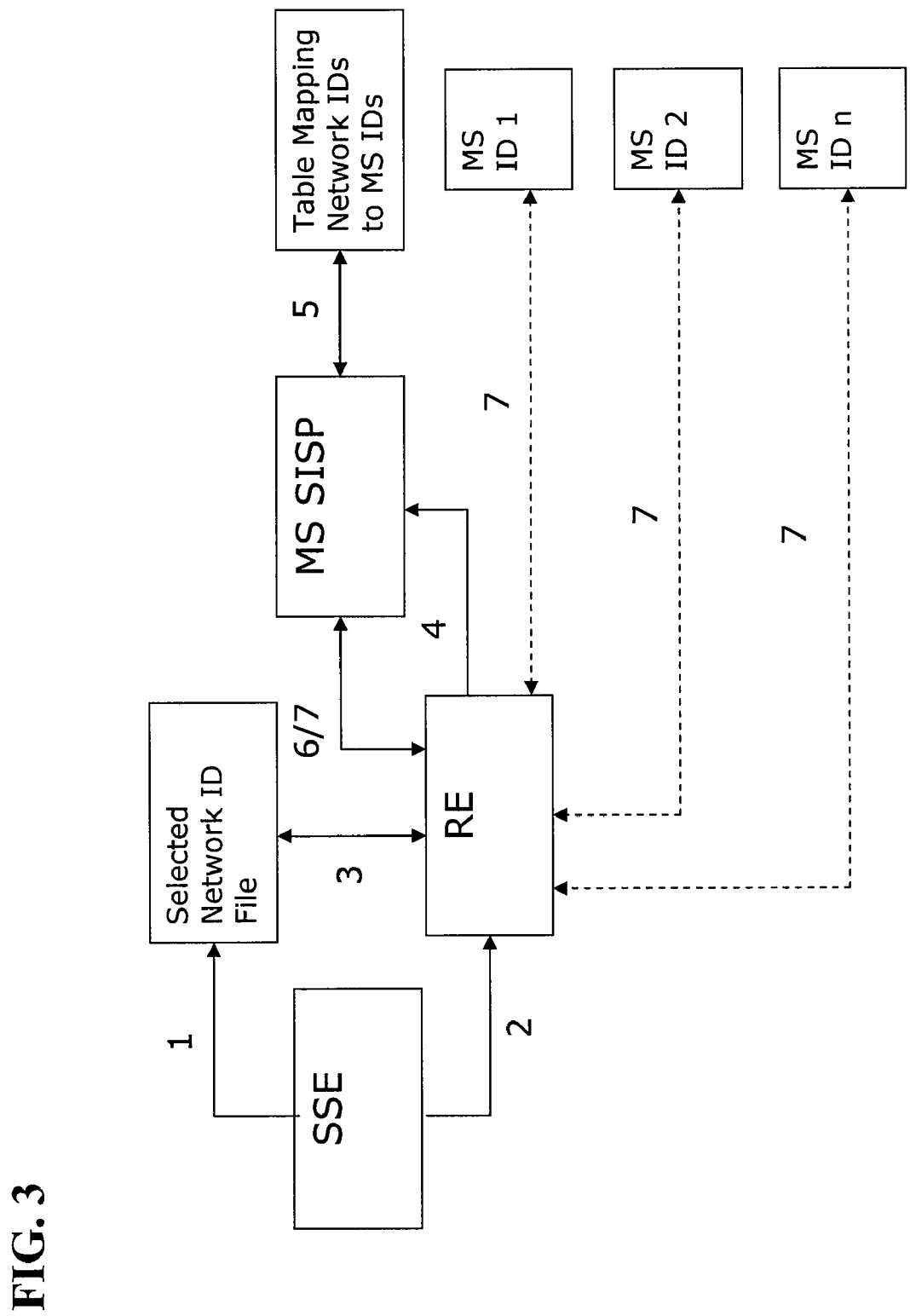

Reference now is made in detail to the examples illustrated in the accompanying drawings and discussed below. FIGS. 1 to 3 are diagrams that illustrate exemplary techniques for a single-mode technology or multi-mode/technology capable mobile station having a plurality of subscriber identities, which selects a subscriber identity for registration on a network for wireless communications. The mobile station having multiple subscriber identities, at a high level, utilizes an identity selection algorithm, which selects a subscriber identity of the mobile station based on the network selected for wireless communications. Once a subscriber identity is selected, the mobile station may register the selected identity with the selected network through over-the-air wireless signaling with the selected network.

At the outset, a network for wireless communications is selected by the mobile station. To this end, the mobile station detects a signal identifying one or more mobile networks providing wireless communications service in a region of operation, for example, a country of current operation, typically from over-the-air signaling received from a base station of a network in the currently visited area. The particular system selection algorithm utilized, however, may take any form, and is not limited by the disclosure contained herein, nor is intended to limit the present disclosure.

One example provides for using a high order technology preference list and the country identification, the mobile station selects the preferred technology for the region within which the mobile station is currently operating. The mobile station also utilizes a number of network or system preference lists supported by respective standards for the various network technologies that the mobile station is capable of using. For example, if the mobile station device supports 3GPP2 technologies and 3GPP technologies, the device would have one or more PRL type lists and one or more PLMN lists. Having picked one of the technologies based on the country and the high order technology preference list, the mobile station uses the selected one of the technologies to search for the most preferred network or system of the particular technology type and applies the corresponding system or network selection list. Essentially, the mobile station scans for system identifiers using the selected technology communications and picks the network or system of that technology that has the highest priority as indicated on the list corresponding to the selected technology.

Once the preferred network has been identified, the mobile station will have one or more codes that identify the selected network (e.g. a code or code pair from its preference list and/or a matching code or code pair from the over-the-air signaling). Typically, this identity is represented by an identifier, for example an MCC/MNC pair for 3GPP technologies, or a SID/NID pair for 3GPP2 technologies. Of course, any identifier which identifies the selected network may be used in accordance with the present disclosure. In addition, the selected network may be used to select the appropriate access technology for the network selected. For example, in a typical commercial implementation, the multi-mode mobile station supports operation via at least one 3GPP2 technology and supports operation via at least one 3GPP technology. There are more than one 3GPP and 3GPP2 technologies. Examples of 3GPP access technologies are GSM UMTS, LTE etc.; and examples of 3GPP2 access technologies are 1×RTT and EVDO.

In one example, for each country, the higher order technology preference list of countries specifies a preference for one or more 3GPP2 technologies and one or more 3GPP technologies. An example of the higher order preference list for a particular country could be like this: 1st priority LTE (3GPP), 2nd priority 1×RTT (3GPP2), 3rd priority UMTS etc. So the mobile would look for 3GPP (LTE) technology first. If the mobile station does not find LTE, it would then look for 3GPP2 (1×RTT), and if it did not find 1×RTT, it would look again for a 3GPP (UMTS specifically) access technology.

Alternatively, in another example, the mobile station may select the correct access technology based upon the network detected and selected, in which the network identifier is associated with a particular access technology, or plurality of access technologies. In this example, the mobile device selects a particular access technology based on the network detected and selected by the mobile device, for example, by utilizing a list or other instruction set that associates a network identifier with a particular access technology.

Then, the mobile station will register for communication via that selected network. In the case of a mobile station having multiple subscriber identities, an identity, from among the multiple identities, must be selected to register the mobile station with the selected network. To select a particular identity, the mobile station includes a list, table, or similar instruction set which associates a set of networks with its various mobile station subscriber identities. Once the network has been selected, the mobile station selects the identity associated with the selected network. The mobile station will then use the selected identity to register the mobile device with the selected network in order to avail itself of wireless communications services.

With that overview, we will now consider a more specific example of the identity selection algorithm, with reference to the diagram and flow charts of FIGS. 1 to 3. This example supports selection between multiple identities across 3GPP2 (1×RTT, EVDO) technologies and 3GPP (LTE/GSM/UMTS) technologies as well as specific operators' networks for domestic and international roaming. This example also supports selection between multiple subscriber identities based on the network selected, and optionally between the time of day the network is selected, the access technology of the selected network, or both. Those skilled in the art will recognize, however, that the algorithm may support other selection criteria, e.g. between different or additional numbers of wireless communication network technologies.

With reference to FIG. 1, a diagram shows an exemplary communication connectivity of the components of a mobile station and method for mobile station subscriber identity selection with various steps identified by number between the entities utilized to perform each step. A System Selection Entity (SSE) selects a preferred network in a manner as discussed earlier. Once the network has been selected, the SSE will communicate with a Registration Entity (RE) to begin registration of the mobile station with the selected network (step 1). The SSE may communicate the identity of the selected network to the RE or instruct the RE to read the identity of the selected network from a Selected Network ID file, or both. The RE communicates with a Selected Network ID file to obtain the selected network identifier (for example, a MCC/MNC pair, or a SID/NID pair) from the Selected Network ID file (step 2). Once the RE obtains the selected network identifier, the RE communicates with a MS Subscriber Identity Selection Program (MS SISP) to instruct the MS SISP to begin mobile station subscriber identity selection utilizing the selected network identifier (step 3). The MS SISP reads the selected network identifier and selects the mobile station subscriber identity by utilizing a Table Mapping Network IDs to MS IDs, which associates networks with particular mobile station subscriber identities (step 4). Once the mobile station subscriber identity is selected, the MS SISP will communicate with the RE to enable the RE to read the right one of the identity files (e.g., MS ID 1, MS ID 2, MS ID n) associated with the selected mobile station subscriber identity (step 5), or send the selected identity to the RE (step 6), or both (steps 5, 6). As a result, the RE obtains the correct mobile station subscriber identity to register with the selected network.

As shown in the example of FIG. 1, the SSE, RE and Selected Network ID File are organized in a group and the MS SISP and associated files are organized in a second group. In this example, the SSE, RE, and Selected Network ID file may be stored on memory of the mobile device, for example, flash memory or RAM. The MS SISP and associated files may be stored on memory of the mobile device, for example, flash memory, or more preferably, on removable memory, such as a UICC, or SIM card.

With reference to FIG. 2, the following is an outline of the steps of another exemplary identity selection algorithm. Each step is designated in the figures by a number corresponding to the numbered step and is located between the entities that communicate and/or perform the disclosed steps. An exemplary network in which the mobile station may operate and search is described later, with regard to FIG. 4. The device referred to in the outline is typically a mobile station, an example of which will be described in more detail later with regard to FIG. 5.

Step 1—A System Selection Entity (SSE) in the mobile station will use a system selection algorithm to select a 3GPP based technology mobile network or a 3GPP2 based technology mobile network. The network is identified by a MCC/MNC pair of values, in the case of a 3GPP based network; or the network is identified by a SID/NID pair of values, in the case of a 3GPP2 based network. The SSE will write the MCC/MNC pair of values or the SID/NID pair of values into a file, for example, a Selected Network ID File. The SSE may also write the time of day (TOD) into the same file. In addition, the SSE may also write the identity of the access technology of the selected network into the same file.

Step 2—The SSE signals an event notification or triggers a Registration Entity (RE) to perform registration.

Step 3—The RE sends an event notification or trigger to the MS Subscriber Identity Selection Program (MS SISP) on memory of the mobile station.

Step 4—The MS SISP obtains data from the Selected Network ID file (including TOD and access technology data, if available) associated with the event/trigger by reading the selected network identity (and TOD value and access technology value, or both, if available) from the appropriate file in the device.

Step 5—The MS SISP accesses a selected network and subscriber identifier file, for example, a Table Mapping Network IDs to MS IDs in the mobile station memory and selects the appropriate mobile station subscriber identity for the selected network. For example, as shown below in Table 1, if the selected network is identified by a pair of values 208/02 (MCC/MNC), then the MS SISP selects the appropriate mobile station identity, represented by an IMSI (or an MDN/MIN pair), for the selected network.

TABLE 1

| Mobile Country Code (MCC) | Mobile Network Code (MNC) | Access Technology | International Mobile Subscriber Identity (IMSI) |
|---|---|---|---|
| 344 | 030 | | 204_04_4786775625 |
| 505 | 03 | | 204_04_4786775625 |
| 302 | 651 | | 310_012_725663294 |
| 208 | 01 | LTE | 310_012_725663294 |
| 208 | 02 | UMTS, GSM | 204_04_4786775625 |
| 404 | 45 | | 310_012_725663294 |
| ... | ... | | ... |

Additional examples of Tables Mapping Network IDs to MS IDs are shown in Tables 2-4 below.

TABLE 2

| Mobile Country Code (MCC) | Mobile Network Code (MNC) | International Mobile Subscriber Identity (IMSI) | Time Of Day | Access Technology |
|---|---|---|---|---|
| 344 | 030 | 204_04_4786775625 | Any time | |
| 505 | 03 | 204_04_4786775625 | Any time | |
| 302 | 651 | 310_012_725663294 | Any time | |
| 208 | 01 | 310_012_725663294 | Any time | LTE |
| 208 | 01 | 204_04_4786775625 | Any time | UMTS, GSM |
| 208 | 02 | 204_04_4786775625 | 9:00:00 am to 5:00:00 pm | |
| 208 | 02 | 310_012_725663294 | 5:00:01 pm to 8:59:59 am | |
| ... | ... | ... | ... | |

TABLE 3

| System ID (SID) | Network ID (NID) | Access Technology | MDN/MIN |
|---|---|---|---|
| 2567 | 337 | | 4786775625/4786775621 |
| 301 | 03 | | 4786775625/4786775621 |
| 507 | 37 | | 7256632942/7256634985 |
| 32 | 01 | EvDO | 7256632942/7256634985 |
| 122 | 02 | 1xRTT | 4786775625/4786775621 |
| 956 | 45 | | 7256632942/7256634985 |
| ... | ... | | ... |

TABLE 4

| System ID (SID) | Network ID (NID) | MDN/MIN | Time Of Day | Access Technology |
|---|---|---|---|---|
| 2567 | 337 | 4786775625/4786775621 | Any time | |
| 301 | 03 | 4786775625/4786775621 | Any time | |
| 507 | 37 | 7256632942/7256634985 | Any time | EvDO |
| 507 | 37 | 4786775625/4786775621 | Any time | 1xRTT |
| 32 | 01 | 7256632942/7256634985 | Any time | |
| 122 | 02 | 4786775625/4786775621 | 9:00:00 am to 5:00:00 pm | |
| 122 | 02 | 7256632942/7256634985 | 5:00:01 pm to 8:59:59 am | |
| 956 | 45 | 7256632942/7256634985 | Any time | |
| ... | ... | ... | ... | |

Tables 3 and 4 illustrate examples of identifying networks using a SID/NID pair, used, for example, in 3GPP2 technolo-gies. Table 3 also illustrates use of a MDN/MIN pair for identifying the mobile station, instead of an IMSI.

In a TOD example, as shown in Table 2, a particular network may be associated with more than one identity based on the time of day the network is selected. As shown in Table 2, if the TOD read by the MS SISP from the Selected Network ID File is between 5:00:01 pm and 8:59:59 am, the MS SISP will select a first mobile identity. If, on the other hand, the TOD read by the MS SISP from the Selected Network ID File is between 9:00:00 am and 5:00:00 pm, the MS SISP will select a second mobile identity for the same selected MCC/MNC pair. Likewise, the selection may also be determined by the access technology used, or both the TOD and the access technology used.

Step 6—The MS SISP will return the selected identity, for example an IMSI (or MDN/MIN pair) to the RE. Alternatively, the memory on the mobile station may be configured such that once the MS SISP has selected the appropriate mobile identity, it will allow the RE to read the correct MS ID file, as represented by, for example, MS ID 1, MS ID 2, . . . , MS ID n.

Step 7—The RE receives the mobile identity from the MS SISP, or reads the correct identity from memory of the mobile station (as shown by dotted lines in FIG. 2). The mobile station subscriber identity is thereby selected, and the RE may register the selected identity with the selected network via over-the-air wireless signaling with the selected network.

With reference to FIG. 3, the following is an outline of the steps of a further exemplary identity selection algorithm. Each step in FIG. 3 is designated in the figures by a number corresponding to the numbered step and are located between the entities which communicate and/or perform the disclosed steps.

Step 1—An SSE in the mobile station will use a system selection algorithm to select a 3GPP based technology mobile network or a 3GPP2 technology based mobile network that is identified by a MCC/MNC pair of values, in this case of a 3GPP based network, or a SID/NID pair of values, in the case of a 3GPP2 based network. The SSE will write the MCC/MNC pair of values or the SID/NID pair of values into a file, for example, a Selected Network ID File. The SSE may also write the TOD value into the same file. In addition, the SSE may also write the identity of the access technology used by the selected network into the same file.

Step 2—The SSE signals an event notification or triggers a Registration Entity (RE) to perform registration.

Step 3—The RE reads the selected network values from the Selected Network ID File, which may include the MCC/MNC pair (or SID/NID pair), along with any TOD value, an access technology value, or both.

Step 4—The RE sends the values obtained from the Selected Network ID File along with a trigger or event notification to the MS SISP stored on memory of the mobile station.

Step 5—The MS SISP accesses a selected network and subscriber identifier file, for example, a Table Mapping Network IDs to MS IDs in the mobile station memory and selects the appropriate mobile station subscriber identity for the selected network. For example, as shown below in Table 1, if the selected network is identified by a pair of values 208/02 (MCC/MNC), then the MS SISP selects the appropriate mobile station subscriber identity, represented by an IMSI, for the selected network. Additional examples of Tables Mapping Network IDs to MS IDs shown in Tables 2-4 above. Tables 3 and 4 illustrate examples of identifying networks using a SID/NID pair, used, for example, in 3GPP2 technologies. Table 3 also illustrates use of a MDN/MIN pair for identifying the mobile station subscriber, instead of an IMSI.

In a TOD example, as shown in Table 2, a particular network may be associated with more than one identity based on the time of day. As shown in Table 2, if the TOD read by the MS SISP from the Selected Network ID File is between 5:00:01 pm and 8:59:59 am, the MS SISP will select a first mobile identity. If, on the other hand, the TOD read by the MS SISP from the Selected Network ID File is between 9:00:00 am and 5:00:00 pm, the MS SISP will select a second mobile identity. Likewise, the selection may also be determined by the access technology used, or both the TOD and the access technology used.

Step 6—The MS SISP will return the selected identity, for example an IMSI (or MDN/MIN pair) to the RE. Alternatively, the memory on the mobile station may be configured such that once the MS SISP has selected the appropriate mobile identity, it will allow the RE to read the correct identity file from the device, as represented by, for example, MS ID 1, MS ID 2, ..., MS ID n.

Step 7—The RE receives the mobile subscriber identity from the MS SISP, or reads the correct identity from memory of the mobile station (as shown by dotted lines in FIG. 3). The mobile station subscriber identity selection procedure is thereby selected, and the RE may register the selected identity with the selected network via over-the-air wireless signaling with the selected network.

To appreciate the application of the above-discussed algorithms, it may be helpful to consider the context of an exemplary system of networks as well as the hardware and software of an exemplary mobile station device, as may be involved in implementing the selection technique. The mobile station will be discussed later with regard to FIG. 5

Figure 4:
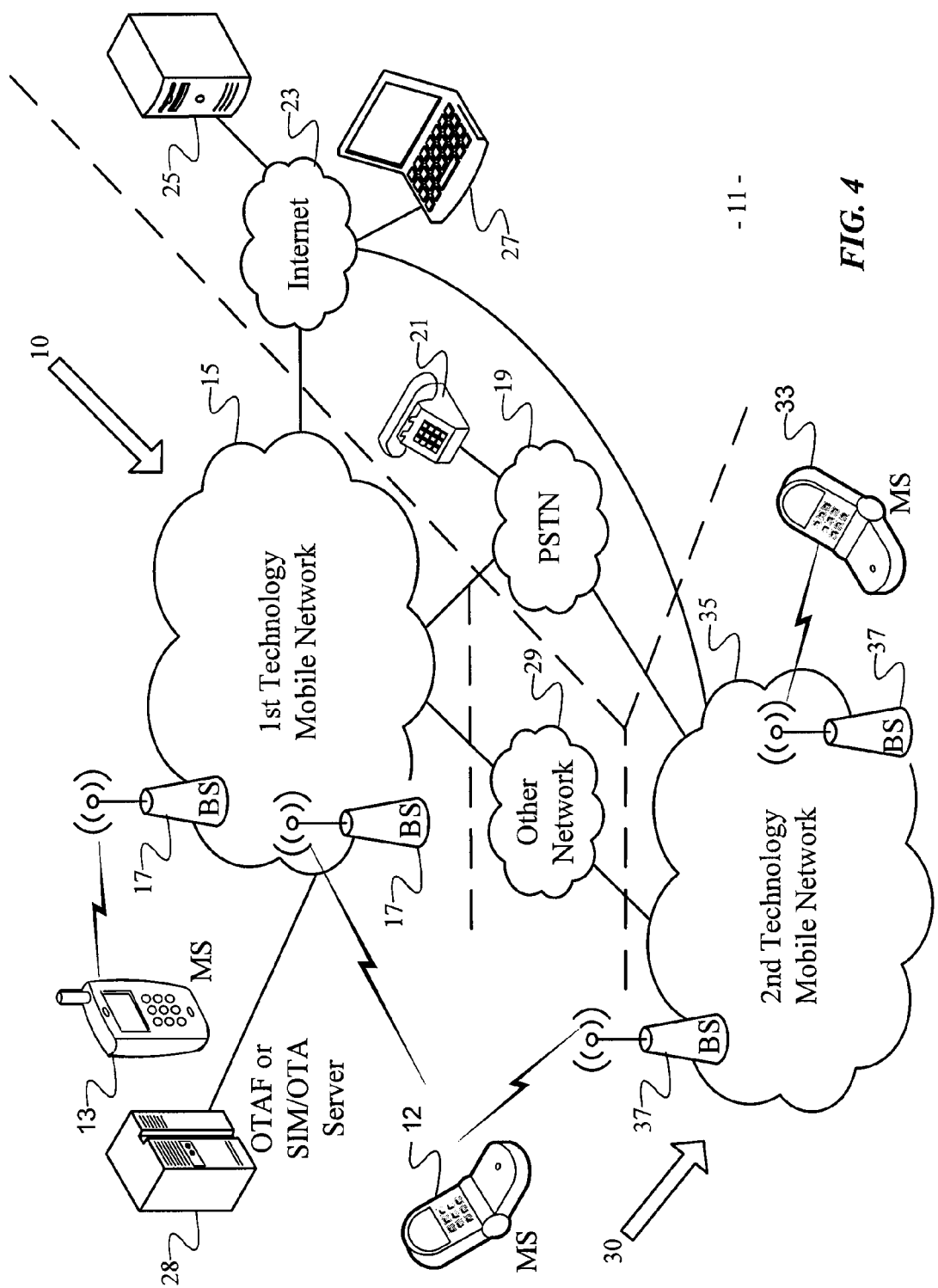
FIG. 4 is a high level functional block diagram, useful in explaining mobile stations, network elements and other components that may be involved in mobile station communications and related network and mobile station subscriber identity selection functions.

FIG. 4 is a functional block diagram of an exemplary system of wireless networks for providing mobile voice telephone services and various data services. For discussion purposes, the diagram shows two wireless networks 10 and 30 operated in accord with different technology standards. The networks 10 and 30 often (but not always) may be operated by different wireless service providers, carriers or operators. The communication networks 10 and 30 implementing the illustrated system provide mobile voice telephone communications as well as other services such as text messaging and various multimedia packet data services, for numerous mobile stations. For purposes of later discussion three mobile stations 12, 13 and 33 appear in the drawing. The elements indicated by the reference numerals 10 and 30 generally are elements of the respective operator's network, although the mobile stations 12, 13 and 33 typically are sold to the carrier's customers. Today, mobile stations typically take the form of portable handsets, smart-phones or personal digital assistants, data cards for computers, although they may be implemented in other form factors. Each mobile communication network 10 or 30 provides communications between mobile stations 12, 13 and 33 as well as communications for the mobile stations with other networks and stations shown generally at 11 outside the mobile communication networks. An inter-carrier or other intermediate network 29 may provide communication connectivity between the mobile communication networks 10 and 30.

Each network 10 and 30 allows users of the mobile stations operating through the respective network to initiate and receive telephone calls to each other as well as through the public switched telephone network (PSTN) 19 and telephone stations 21 connected thereto. One or both of the networks typically offers a variety of text and other data services, including services via the Internet 23, such as downloads, web browsing, e-mail, etc. via servers shown generally at 25 as well as message communications with terminal devices represented generally by the personal computer 27.

The networks 10 and 30 are generally similar, except in our example, they offer respective services via two different wireless communication technologies. For purposes of an example for discussion here, we will assume that the network 10 is a 3GPP2 (1×RTT, EVDO) access technology network, whereas the network 30 is a 3GPP (LTE/GSM/UMTS) access technology network.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13 will typically include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 typically comprises a base transceiver system (BTS) which communicates via an antennae system at the site of base station and over the airlink with one or more of the mobile stations 13, when the mobile stations are within range. The BTS is the part of the radio network that sends and receives RF signals to/from the mobile stations that the base station currently serves. Hence, in our example, the BTS would utilize 3GPP2 (1×RTT, EVDO) type transceiver equipment and implement communications in accord with the protocols of the applicable 3GPP2 standard, for signaling, registration, voice communication, data communication, etc. For example, each base station 17 will broadcast certain standardized information to allow a mobile station 12 or 13 in the region to search for, find and lock-onto the base station 17 and acquire information needed to register and initiate communications via the network 10, all in accord with the standard 3GPP2 protocols.

The radio access networks also include a traffic network represented generally by the cloud at 15, which carries the user communications for the mobile stations 12, 13 between the base stations 17 and other elements with or through which the mobile stations communicate. Individual elements such as switches and/or routers forming the traffic network 15 are omitted here for simplicity. Although not separately shown, the network 15 will include or connect with a number of service control elements, for authenticating mobile stations to use the network 10, for authenticating mobile device users and/or for authorizing users or devices to access various services and service features offered by the particular network 10, and for usage accounting and billing functions.

The traffic network portion 15 of the mobile communication network 10 connects to a public switched telephone network 19. This allows the network 10 to provide voice grade call connections between mobile stations and regular telephones connected to the PSTN 19. The drawing shows one such telephone at 21. The traffic network portion 15 of the mobile communication network 10 also connects to a public packet switched data communication network, such as the network commonly referred to as the "Internet" shown at 23. Packet switched communications via the traffic network 15 and the Internet 23 may support a variety of user services through the network 10, such as mobile station communications of text and multimedia messages, e-mail, web surfing or browsing, programming and media downloading, etc. For example, the mobile stations may be able to receive messages from and send messages to user terminal devices, such as personal computers, either directly (peer-to-peer) or via various servers 25. The drawing shows one user terminal device as a personal computer (PC) at 27, by way of example.

The carrier or service provider that operates the network 10 will also operate a number of systems that provide ancillary functions in support of the communications services provided through the network 10, and those elements communicate with other nodes/elements of the network 10 via one or more private IP type packet data networks or Intranets (not separately shown). Such systems maintain various records used for authentication and authorization functions and provisioning necessary information into the mobile stations to enable their operation via the network 10. Of note for purposes of the present discussion of the identity selection algorithms, one or more such systems provide the capability to download at least the lists and/or updates thereof into the mobile stations of the network operator, in this example, via the networks. These systems may also support downloading of the executable programming for the identity selection via the networks, to initially install such programming in the mobile stations or to fix or update the programming in the mobile stations over time. An example of such a system that may facilitate programming and/or list downloading via the networks is the Over-The-Air service activation/provisioning Function (OTAF) 28 for 3GPP2 technologies (or a Subscriber Identity Module/Over-The-Air, i.e., a SIM/OTA function for 3GPP technologies or 3GPP2 technologies). In the example, the OTAF or SIM/OTA 28 may be a server connected to the traffic network 15, to enable the server to communicate with the mobile stations of that network operator's customers.

As noted earlier, many mobile wireless communications networks have been deployed and are available today. For purposes of discussion, the example of FIG. 4 shows a second mobile network 30. In our example, the network 30 is operated by a different carrier or service provider than the operator of network 10. In some areas, the second network 30 could utilize the same wireless technology as the network 10, but in our example, the network 30 utilizes a different wireless network technology. The network 10 is a 3GPP2 (1×RTT, EVDO) technology network, and in the example, the network 30 is a 3GPP (LTE/GSM/UMTS) technology network.

Like the network 10, the physical elements of the radio access network (RAN) 30 include a number of base stations (BSs) 37, each of which includes a base transceiver system (BTS) and associated antenna system. In our example, each BTS of a base station 37 would utilize 3GPP (LTE/GSM/UMTS) type transceiver equipment and implement communications in accord with the protocols of the applicable 3GPP standard, for signaling, registration, voice communication, data communication, etc. For example, each base station 37 will broadcast certain standardized information to allow a mobile station 12 or 33 in the region to search for, find and lock-onto the base station 37 and acquire information needed to register and initiate communications via the network 30, all in accord with the standard 3GPP protocols.

The radio access network portions of network 30 also include a traffic network represented generally by the cloud at 35, which carries the user communications for the mobile stations 12, 33 between the base stations 37 and other elements with or through which the mobile stations communicate. Individual elements such as switches and/or routers forming the traffic network 35 are omitted here for simplicity. Although not separately shown, the network 35 will include or connect with a number of service control elements, for authenticating mobile stations to use the network 30, for authenticating mobile device users and/or for authorizing users or devices to access various services and service features offered by the particular network 30.

Similar to network 10, the traffic network portion 35 of the mobile communication network 30 connects to a public switched telephone network 19, to offer voice grade telephone call connections between mobile stations and regular telephones 21 connected to the PSTN 19. The traffic network portion 35 of the mobile communication network 30 also connects to a public packet switched data communication network, such as the network commonly referred to as the "Internet" shown at 23, for various mobile station communications with servers 25 and/or user terminal devices 27. Although omitted for simplicity, the network 30 may also include various systems that provide ancillary functions in support of the communications services provided through the network 30, such as a system similar to the OTAF 28, for example a SIM/OTA, for providing data and/or programming downloads to the mobile stations of that network operator's customers.

As discussed earlier, the mobile station subscriber identity selection techniques of FIGS. 1 to 3 configure a mobile station to generally take advantage of the most favorable roaming agreements between network operators, when selecting identities of the mobile stations as the customer roams with the mobile station. Using the networks of FIG. 4 as an example, the identity algorithms provide the flexibility for a mobile station such as 12 having a plurality of identities to select an identity from the plurality of identities to register the mobile station to the 3GPP2 (1×RTT, EVDO) access technologies of a visited network 10 or the 3GPP (LTE/GSM/UMTS) access technologies of another visited network 30 as well as specific operators' networks for domestic and international roaming.

Assume that the mobile station 12 has dual mode capability to utilize both 3GPP2 and 3GPP technology networks. Via the OTAF server 28 or other means, the home operator that provides service to the customer has installed the mobile station subscriber identity selection programming to implement an algorithm from FIGS. 1 to 3 in the mobile station 12 and has downloaded the various files and lists discussed earlier relative to those figures as well as the PRL and or PLMN lists used for system selection. We will assume for discussion purposes that the station 12 is in an area where it can detect base station signaling from both visited networks 10 and 30 and therefore could use either one of those two networks upon selection and registration. However, for purposes of this part of the discussion, we will assume that both networks 10, 30 are operated by other services providers (not the "home" operator) and thus are "visited" by the mobile station 12 as its user roams.

At a high level, in one example, the mobile station 12 detects the country of current operation, typically from over-the-air signaling received from a base station 17 or 37 of a network in the current area of operation. The particular system selection algorithm utilized, however, may take any form, and is not limited by the disclosure contained herein, nor is intended to limit the present disclosure. In another example, the mobile station 12 uses a stored high order list, which identifies a preferred technology for each of the countries in which the operator's mobile stations may roam and obtain service, to initially select the preferred technology for the region within which the mobile station is currently operating. Although in many locations around the world the preference may be for 3GPP technology, for discussion purposes, assume that the mobile station 12 is operating in the US, and based on its high order list processing selects 3GPP2 as the preferred technology.

As discussed, in one example, the mobile station also utilizes a number of network or system preference lists supported by respective standards for the various network technologies that the mobile station is capable of using. In our current example, the mobile station device supports 3GPP2 technologies and 3GPP technologies, therefore the device has one or more PRL type lists for 3GPP2 network selection and one or more PLMN lists for 3GPP network selection. Having picked one of the technologies based on the country and the high order technology preference list, the 3GPP2 technology in the present example, the mobile station uses the selected one of the technologies to search for the most preferred network or system of the particular technology type using the corresponding system or network selection list. Essentially, the mobile station scans for system identifiers using the selected technology communications and picks the detected network or system of that technology that has the highest priority as indicated on the list corresponding to the selected technology. In the example of FIG. 4, since the 3GPP2 technology is preferred in the US, the mobile station 12 searches for a 3GPP2 network. Upon detection of the signaling from a base station 17 of the 3GPP2 type network 10, the mobile station determines the priority of the detected network from the PRL processing. If the detected network is sufficiently high (or no higher network is detected through the search and PRL processing), then, the mobile station 12 will select that identified network 10 as its intended target for registration. In the mobile station implementations discussed herein, however, before registering with the network 10, the mobile station 12 will select an applicable one of its assigned subscriber identities. Registration and subsequent communication through the selected network, the network 10 in our example, will utilize one or more identifiers for the selected subscriber identity.

As discussed earlier, in order to register the mobile station having multiple identities, the mobile station 12 selects an identity to register with the selected network, in our example network 10, to establish communications with the selected network. Once the network has been selected, the mobile station 12 selects the identity associated with the selected network. To select a particular identity, the mobile station 12 includes a list, table, or similar instruction set which associates a set of networks, including network 10, with various mobile station subscriber identities assigned to the particular mobile station, that is to say, to mobile station 12 in our current example. In one example, a mobile station subscriber identity selection application receives the identity of the selected network 10, represented, for example, by a SID/NID pair, from a registration entity or reads the identity of the selected network from the device, for example, upon an event notification received from the registration entity. The mobile station subscriber identity selection application utilizes the identity of the selected network, for example, the SID/NID pair, to select the correct mobile station subscriber identity. In one further example, the mobile station subscriber identity selection application utilizes a list to match the selected network with a mobile station subscriber identity. The mobile station 12 will then use the selected identity to register the mobile device with the selected network in order to avail itself of wireless communications services. In one example, once the subscriber identity of the mobile station 12 has been selected by the identity selection application, the selected mobile station subscriber identity is sent to the registration entity, or enables the registration entity to read only the selected mobile station subscriber identity file stored on memory. The registration entity utilizes the selected identity to register the mobile device 12 with the selected network 10, via over-the-air signaling with base station 17.

In another example of mobile station subscriber identity selection, the mobile station 12 selects an identity to register with the selected network, in this example, network 30. As discussed above, the identity selection algorithm utilizes the identity of the selected network 30, represented, for example, by an MCC/MNC pair, to associate the identity of the network 30 with the correct mobile station subscriber identity for the network 30. Once the correct identity is selected by the mobile station 12, the mobile station 12 registers the selected identity with the network 30, via over-the-air signaling with base station 37.

As discussed above, the mobile station subscriber identity selection algorithm may also utilize the time of day (TOD) the mobile station 12 selects the network 10, 30 for wireless communication services. In selecting either network, the mobile station subscriber identity selection algorithm may utilize the TOD to select between different identities associated with the same network. For example, once mobile station 12 selects either network 10 or 30 to register with for wireless communication services, the identity selection algorithm may also take into account the TOD the mobile station 12 selected the network, in our example, network 10, but the mobile station could also select network 30 in this example. The identity selection algorithm will then choose amongst different subscriber identities of the mobile station associated with network 10 based on the TOD the mobile station 12 selected network 10. In another example, the mobile station 12 may also utilize the access technology of the selected network 10 or 30 to select the mobile station subscriber identity, in the manner described above. In a further example, the mobile station 12 may utilize both the access technology and the TOD to select the mobile station subscriber identity to register with the network 10 or 30.

As shown by the earlier discussion, the identity selection algorithm is implemented in each of the appropriately configured mobile stations. Although station 12 was discussed by way of example, the same selection technique may be implemented in any or all of the mobile stations 12, 13 and 33 which support multi-mode/technology operations, e.g. for global roaming capability. Those skilled in the art should be quite familiar with the structure, programming and operation of a variety of different mobile stations that might utilize the mobile station identity selection algorithm discussed herein. However, for general completeness and to perhaps help some readers to appreciate an actual implementation of the selection technique, it may be helpful to briefly consider a high level example of a particular mobile station device.

Figure 5:
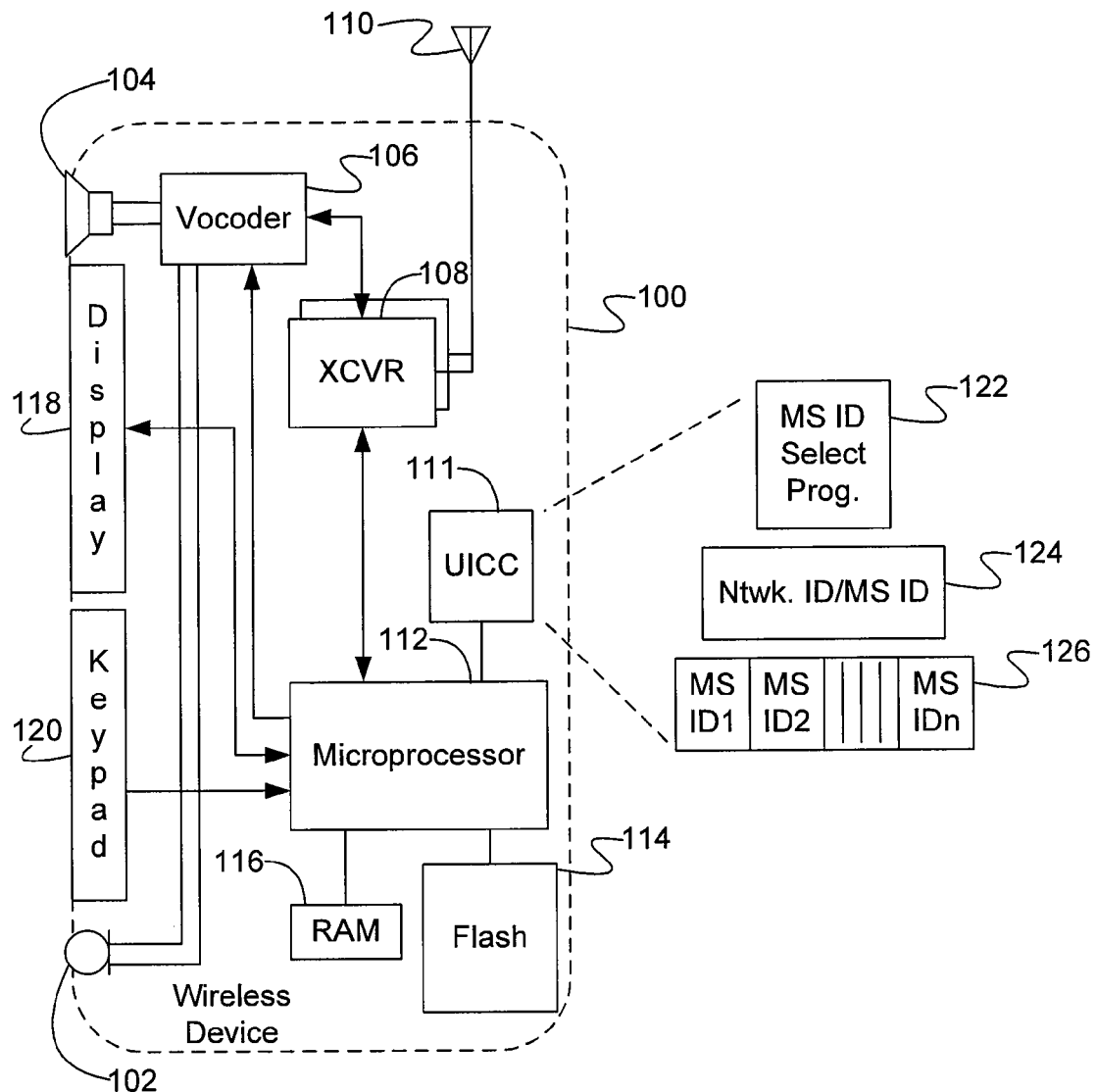
FIG. 5 is a high level functional block diagram of a handset type example of a mobile station, which may be configured to perform subscriber identity selection in accord with the procedures of FIGS. 1-3.

FIG. 5 provides a block diagram illustration of an exemplary wireless device 100, which may be the wireless device 12, 13 or 33 of a customer of any of the network operators. Although the wireless device 100 may be a smart-phone or may be incorporated into another device, such as a portable personal computer, personal digital assistant (PDA) or the like, for discussion purposes, the illustration shows the wireless device 100 in the form of a handset. The handset embodiment of the wireless device 100 functions as a normal digital wireless telephone station. For that function, the station 100 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 100 also includes at least one digital transceiver (XCVR) 108. The handset 100 is a multimode device capable of operations on various technology type networks, such as the networks 10 and 30. For example, the handset 100 may utilize either or both of 3GPP2 (1×RTT, EVDO) access technologies and 3GPP (LTE/GSM/UMTS) access technologies. For that purpose, the transceiver (XCVR) 108 could be a multimode transceiver, or the handset 100 may include two or more transceivers each of which supports a subset of the various technologies or modes. The concepts discussed here encompass embodiments of the station 100 utilizing any digital transceivers that conform to current or future developed digital wireless communication standards.

The transceiver 108 provides two-way wireless communication of information, such as vocoded speech samples and/or digital message information, in a selected one of the technology modes. The transceiver 108 also sends and receives a variety of signaling messages in support of the various voice and data services provided via the station 100 and the communication network (described earlier with regard to FIG. 4). Each transceiver 108 connects through RF send and receive amplifiers (not separately shown) to an antenna 110. In the example, the transceiver 108 is configured for RF communication in accord with a digital wireless protocol, such as the current 3GPP2 and 3GPP protocols. For the network selection function, network communications via the transceiver 108 and antenna 110 will include detection of the available network technology types in any given service area and selection of an available network for communications and selection of one of the mobile station subscriber identities using the any of the procedures discussed above relative to FIGS. 1-3. The network communications may also support downloading of identity selection programming, list, and file data and/or updates thereof from a server such as the OTAF or SIM/OTA server 28.

The station 100 includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. In addition to normal telephone and data communication related input/output, these elements also may be used for display of menus and other information to the user and user input of selections, if needed during a mobile station subscriber identity selection operation or during an identity selection software download operation. Various combinations of the keypad 120, display 118, microphone 102 and speaker 104 may be used as the physical input output elements of the GUI, for multimedia (e.g. audio and/or video) communications. Of course other user interface elements may be used, such as a stylus and touch sensitive display screen, as in a PDA or smart phone.

A microprocessor 112 serves as a programmable controller for the wireless device 100, in that it controls all operations of the wireless device 100 in accord with programming that it executes, for all normal operations, and for operations involved in selecting a preferred technology and an available network of the appropriate technology type, for mobile communications, and for selecting the appropriate subscriber identity of the mobile station. In the example, the wireless device 100 includes non-volatile memory, for example, flash type program memory 114, for storage of various "software" or "firmware" program routines and mobile configuration settings, such as mobile directory numbers (MDN) and/or mobile identification numbers (MIN), etc. The wireless device 100 may also include a non-volatile random access memory (RAM) 116 for a working data processing memory. The wireless device 100 may also include a removable memory, for example, a UICC smartcard 111. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

The executable programming for the microprocessor 122 includes a mobile station subscriber identity selection program 122. The data stored in the mobile station 100 includes the various lists and applications used to select a network and to select an identity of the mobile station, in accord with the identity selection algorithm such as the selection program 122, the Network Identifier/Mobile Station Identifier file 124, and Identity files 126. The program 122 and files 124 and 126 could be stored in the flash memory 114. However, the example of FIG. 5 implements a somewhat different approach.

3GPP variants of the mobile devices often utilize a Subscriber Identity Module or "SIM" card (called UICC in the 3GPP standards documents—universal integrated circuit card), which provides secure storage for various data needed for operation of a mobile station, such as data identifying the mobile station to the network (e.g. MDN and/or MIN, IMSI). The SIM card is a standardized removable module and can be moved from one mobile station device to another, to effectively move the mobile station identity or identities from one device to another. Hence, the mobile station example of FIG. 5 includes a UICC type card 111. As discussed above, the identity selection program 122, Network Identifier/Mobile Station Identifier 124, and Identity files 126 can be downloaded into flash memory or the like in the mobile station. In implementations using UICC or other SIM cards, another approach would be to store the program 122, Network Identifier/Mobile Station Identifier 124, and Identity files 126 to SIM card storage, such as the UICC 111 of mobile station 100.

As shown by the above discussion, functions relating to the selection of a subscriber identity of a mobile station for registering to a selected network for wireless communications to take advantage of the most favorable roaming agreements between operators may be implemented in the form of programming and associated list and file data for controlling operations of a mobile station device. An example of the device has been discussed above relative to FIG. 5. As mentioned earlier, the relevant software (programming, list, and/or file data) may be downloaded and/or updated from a computer platform, for example, from an OTAF server or SIM/OTA server or the like communicating with the mobile station via the network. Although special purpose devices may be used to support the download and update functions, such devices also may be implemented using one or more hardware platforms intended to represent a general class of data processing device commonly used to run "server" and/or "client" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the various technology and system or network selection lists, and mobile station identity selection lists and algorithms. The programming code is executable by the microprocessor 112 of the mobile station, e.g. from storage in the flash memory 114, or from the UICC 111. For downloading and installation, however, the software is stored within the general-purpose computer platform or the like serving as the OTAF system or SIM/OTA system.

Figure 6:
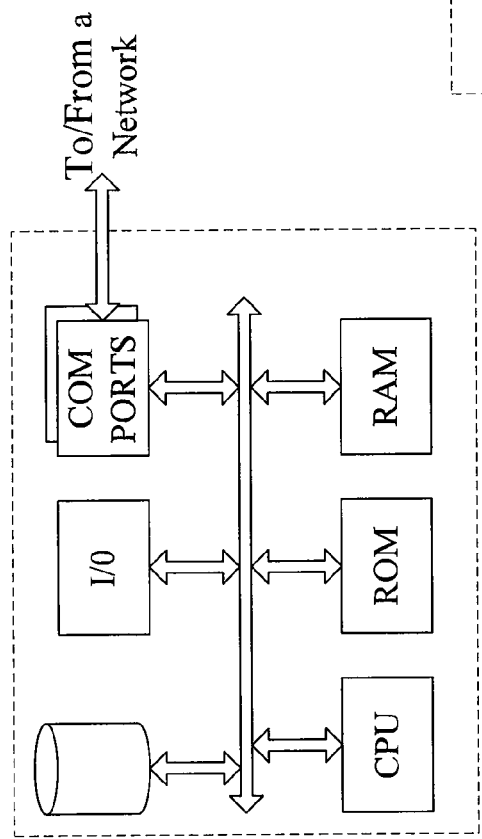
FIG. 6 is a simplified functional block diagram of a computer that may be configured as a host or server.
Figure 7:
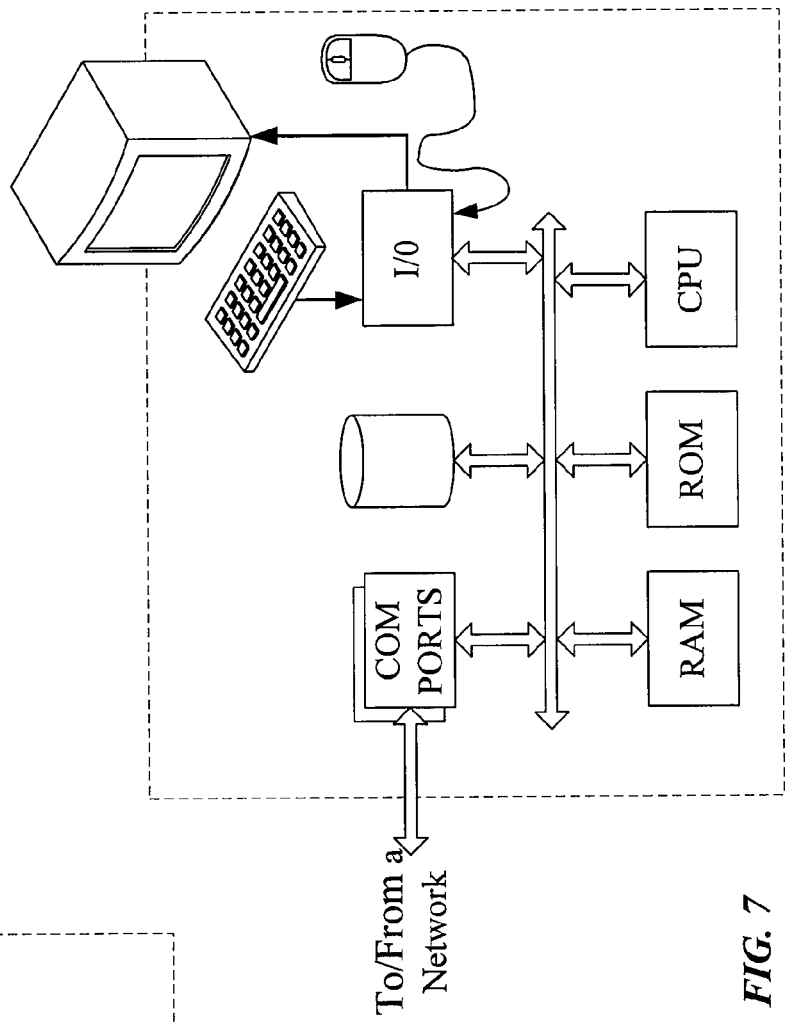
FIG. 7 is a simplified functional block diagram of a personal computer or other work station or terminal device.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of mobile station identity selection outlined above may be embodied in programming. Program aspects of the technology may be thought of as "products" or "articles of manufacture" typically in the form of executable code and/or associated instructions or list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from a computer or processor into the mobile station, for example, from the OTAF server or SIM/OTA server or other computer of the network operator into the mobile station(s) of the operator's customer(s). Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, optical or magnetic disks, such as any of the storage devices in any computer(s) or the like, such as may be used to implement the identity selection algorithms, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions and/or associated list data to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX: ACRONYM LIST

The description above has used a large number of acronyms to refer to various services, messages and system components. Although generally known, use of several of these acronyms is not strictly standardized in the art. For the convenience of the reader, the following list correlates terms to acronyms, as used in the detailed description above.

1×RTT—One (1) times (×) Radio Transmission Technology
  3GPP—Third (3rd) Generation Partnership Project
  3GPP2—Third (3rd) Generation Partnership Project 2
  APN—Access Point Name
  BS—Base Station
  BTS—Base Transceiver System
  CD—Compact Disk
  CD-ROM—Compact Disk-Read Only Memory
  CPU—Central Processing Unit
  DVD—Digital Video Disk DVD-ROM—Digital Video Disk-Read Only Memory
EEPROM—Electrically Erasable Programmable Read Only Memory
EPROM—Erasable Programmable Read Only Memory
EVDO—1x/Evolution-Data Only
GSM—Global System for Mobile
ID—Identification
IMSI—International Mobile Subscriber Identity
IP—Internet Protocol
IR—InfraRed
LTE—Long Term Evolution
MCC—Mobile Country Code
MDN—Mobile Director Number
MIN—Mobile Identification Number
MNC—Mobile Network Code
MS—Mobile Station
MSC—Mobile Switching Center
MSISDN—Mobile Subscriber Integrated Services Digital Network Number
MS SISP—Mobile Station Subscriber Identity Selection Program
MTSO—Mobile Telephone Switching Office
NAI—Network Access Identifier
NID—Network Identifier
PDA—Personal Digital Assistant
OTAF—Over-The-Air service activation/provisioning Function
PCS—Personal Communication Service
PLMN—Public Land Mobile Network
PRL—Preferred Roaming List
PROM—Programmable Read Only Memory
PSTN—Public Switched Telephone Network
RAM—Random Access Memory
RAN—Radio Access Network
RE—Registration Entity
RF—Radio Frequency
ROM—Read Only Memory
SID—System Identifier
SIM—Subscriber Identity Module
SIM/OTA—Subscriber Identity Module/Over-the-Air
SSE—System Selection Entity
TOD—Time of Day
UICC—Universal Integrated Circuit Card
UMTS—Universal Mobile Telecommunications Systems
WAN—Wide Area Network
WiMAX—Worldwide Interoperability for Microwave Access
WLAN—Wireless Local Area Network
XCVR—Transceiver

What is claimed is:

1. A method comprising steps of:
at a mobile station having at least two subscriber identities, detecting a signal identifying one or more mobile networks providing wireless communications service in a region of operation of the mobile station;
determining the region within which the mobile station is currently operating;
selecting a preferred access technology for the region within which the mobile station is currently operating, from among access technologies that the mobile station is configured to selectively utilize;
responsive to the detected signal, selecting a preferred mobile network utilizing the selected access technology for establishing wireless communications for the mobile station, from among networks capable of providing wireless communications service to the mobile station;
selecting a subscriber identity of the mobile station, from among the at least two subscriber identities of the mobile station, based on the selected network;
retrieving a subscriber identifier associated with the mobile station for the selected subscriber identity, from memory of the mobile station; and
registering the mobile station for wireless communications, via over-the-air wireless signaling with the selected network, using the retrieved subscriber identifier for the selected subscriber identity of the mobile station,
wherein the signal identifying one or more mobile networks includes a System Identifier and Network Identifier (SID/NID) pair used in the step of selecting the mobile network, and
wherein the at least two subscriber identities are each represented by a Mobile Directory Number and Mobile Identification Number pair (MDN/MIN pair).

2. The method of claim 1, wherein the step of selecting the subscriber identity of the mobile station is further based on the access technology of the selected network.

3. The method of claim 1, wherein the step of selecting the subscriber identity of the mobile station is further based on a time of day the selected network is selected.

4. The method of claim 1, wherein the memory comprises a removable computer-readable memory.

5. A method comprising steps of:
at a mobile station having a plurality of subscriber identities, detecting a signal identifying one or more mobile networks providing wireless communications service in a region of operation of the mobile station;
determining the region within which the mobile station is currently operating;
selecting a preferred access technology for the region within which the mobile station is currently operating, from among access technologies that the mobile station is configured to selectively utilize;
responsive to the detected signal, selecting a preferred mobile network utilizing the selected access technology for establishing wireless communications for the mobile station, from among networks capable of providing wireless communications service to the mobile station;
selecting at least one of a first subscriber identity associated with a first wireless communications service provider or a second subscriber identity associated with a second wireless communications service provider, from among the subscriber identities of the mobile station stored in memory of the mobile station, based on a preference of the first service provider or the second service provider respectively relative to the selected network; and
registering the mobile station for wireless communications, via over-the-air wireless signaling with the selected network, using the selected subscriber identity of the mobile station,
wherein the signal identifying one or more mobile networks includes a System Identifier and Network Identifier (SID/NID) pair used in the step of selecting the mobile network, and
wherein the first and the second of the mobile station subscriber identities are each represented by a Mobile Directory Number and Mobile Identification Number pair (MDN/MIN pair).

6. A mobile station having at least two subscriber identities configured to implement the steps of the method of claim 5 to select an identity of the mobile station.

7. An article of manufacture, comprising:
instructions for causing a programmable mobile station to implement steps of a method to select a subscriber identity of a mobile station having at least two subscriber identities; and
a non-transitory machine readable storage medium bearing the instructions,
wherein the instructions include instructions to:
- at the mobile station having at least two subscriber identities, detect a signal identifying one or more mobile networks providing wireless communications service in a region of operation of the mobile station;
- determine the region within which the mobile station is currently operating;
- select a preferred access technology for the region within which the mobile station is currently operating, from among access technologies that the mobile station is configured to selectively utilize;
- responsive to the detected signal, select a preferred mobile network utilizing the selected access technology for establishing wireless communications for the mobile station, from among networks capable of providing wireless communications service to the mobile station;
- select at least one of a first subscriber identity associated with a first wireless communications service provider or a second subscriber identity associated with a second wireless communications service provider, from among the subscriber identities of the mobile station stored in memory of the mobile station, based on a preference of the first service provider or the second service provider respectively relative to the selected network; and
- register the mobile station for wireless communications, via over-the-air wireless signaling with the selected network, using the selected subscriber identity of the mobile station, wherein the signal identifying one or more mobile networks includes a System Identifier and Network Identifier (SID/NID) pair used in the step of selecting the mobile network, and
wherein the first and the second of the mobile station subscriber identities are each represented by a Mobile Directory Number and Mobile Identification Number pair (MDN/MIN pair).

8. The method of claim 1, wherein the selecting the preferred mobile network comprises:
scanning for mobile network identifiers of mobile networks using the selected access technology; and
selecting a preferred mobile network from among mobile network identifiers received as part of the scanning.

9. The method of claim 8, wherein the selecting the preferred mobile network from among mobile network identifiers received as part of the scanning comprises selecting a mobile network that has a highest priority from among a list of mobile networks utilizing the selected access technology.

* * * * *